UNITED STATES PATENT OFFICE.

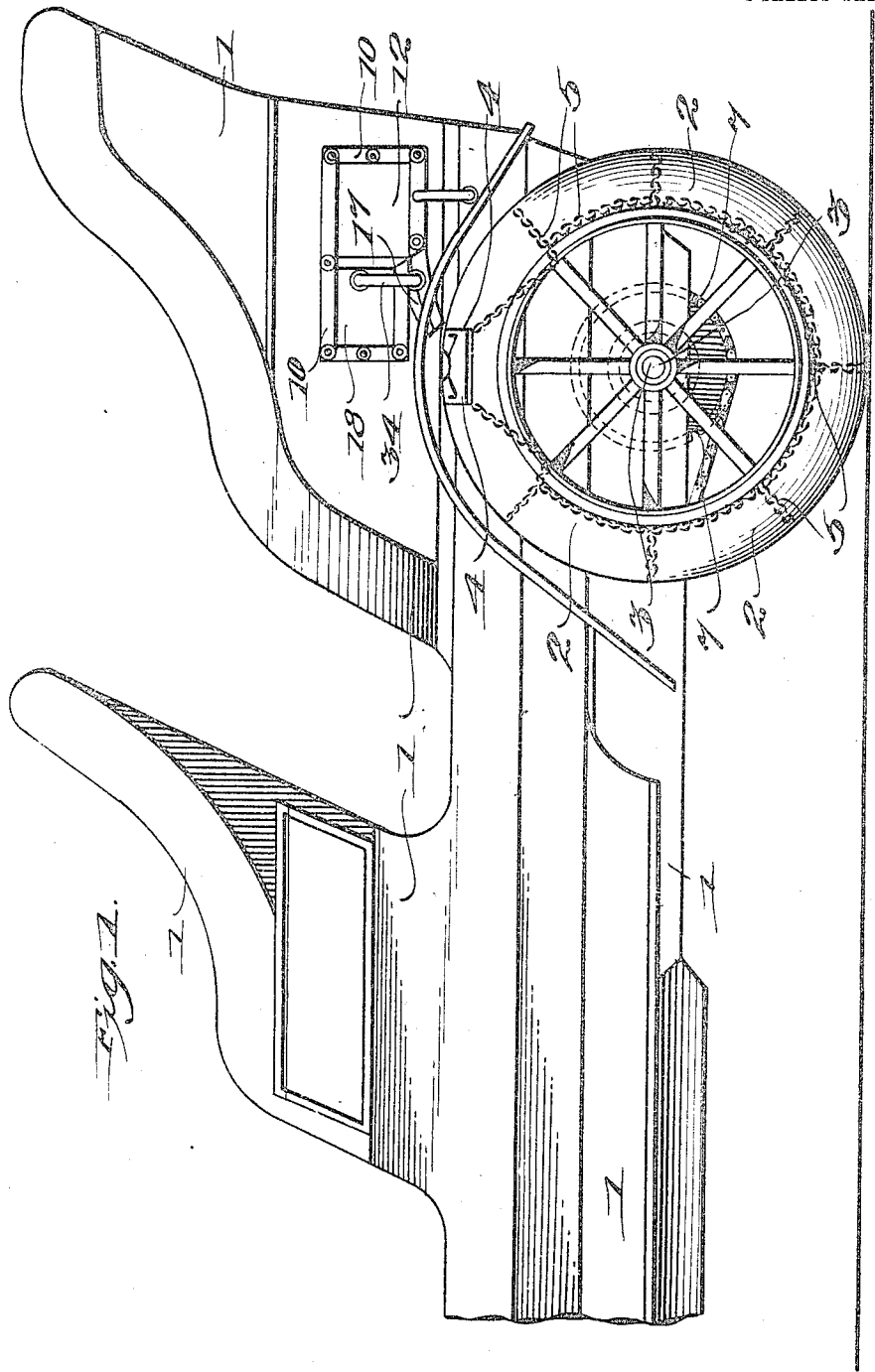

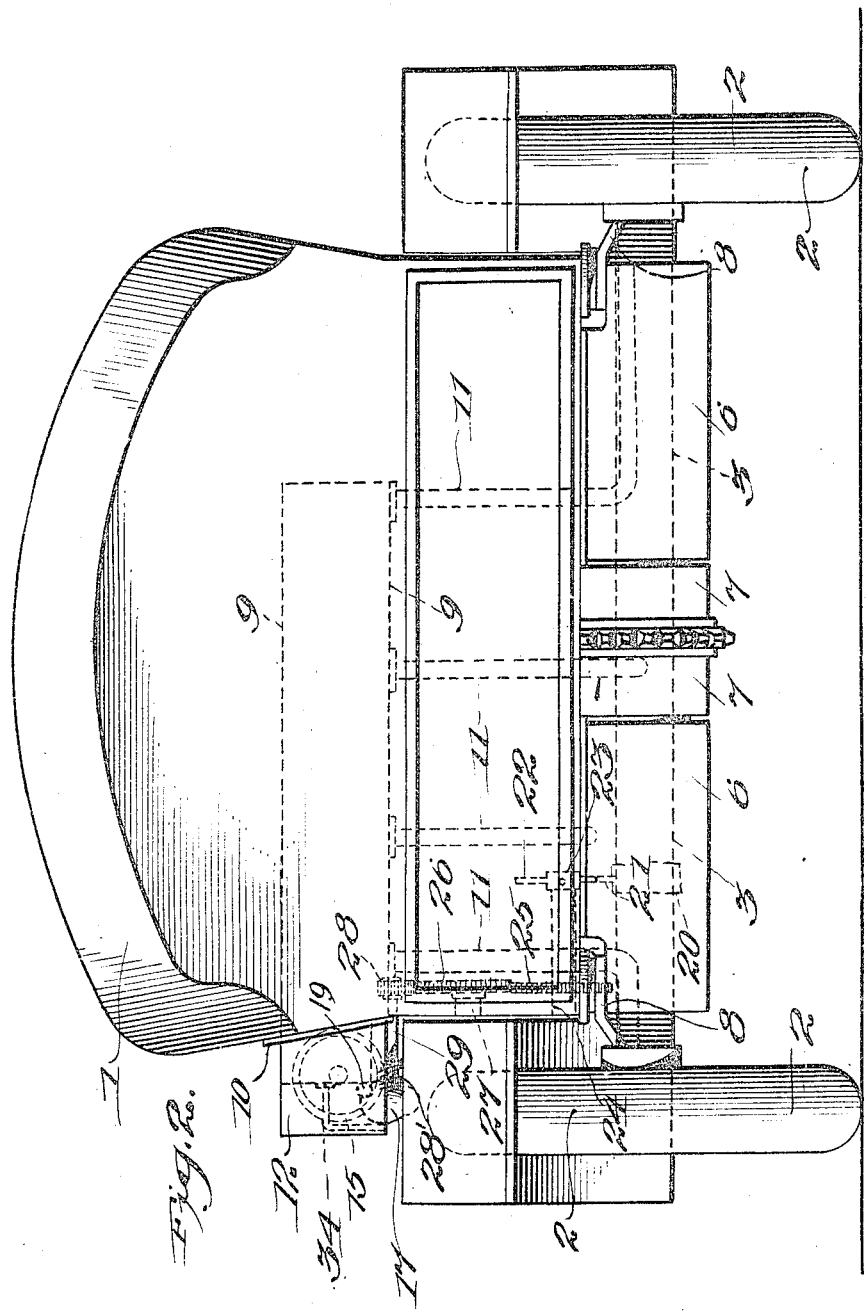

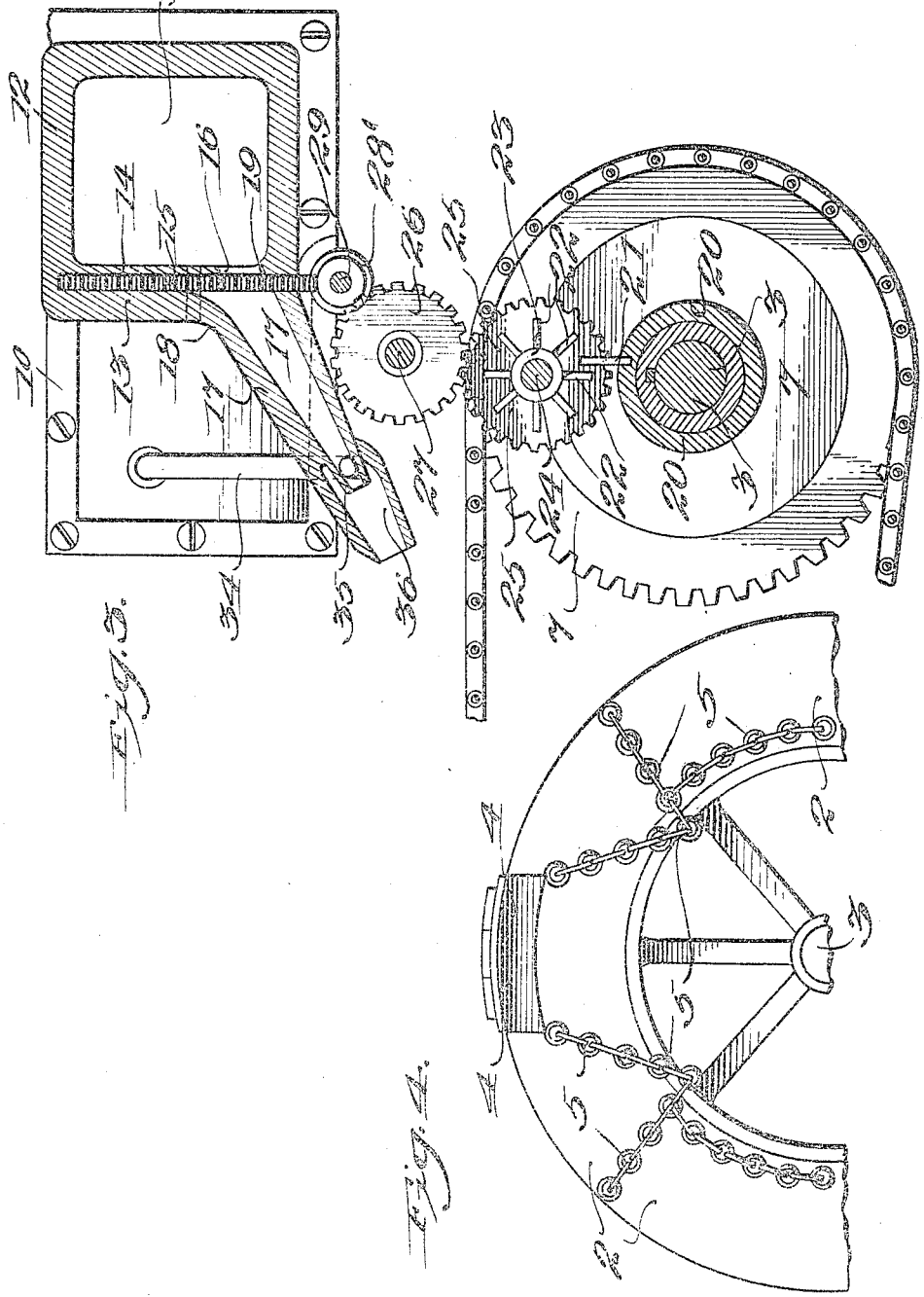

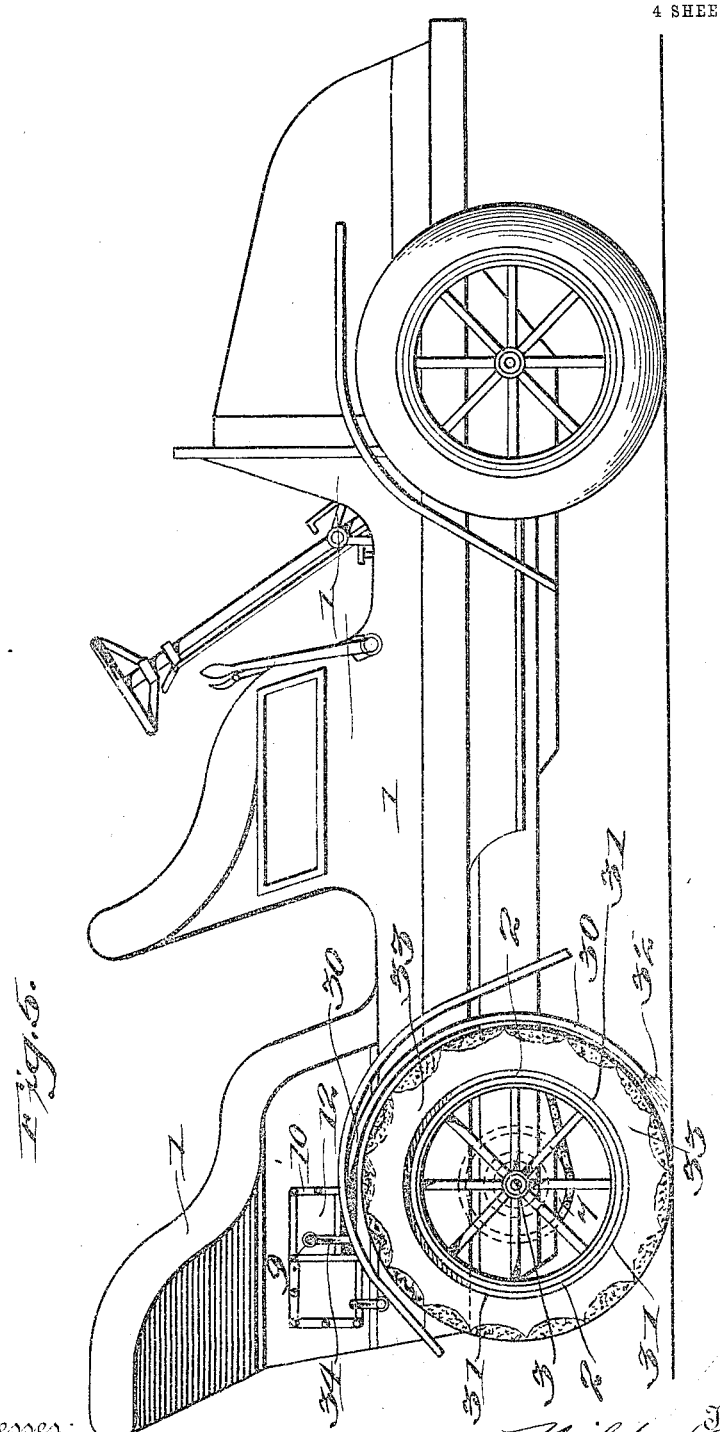

MILDRED FELIX, OF NEW YORK, N. Y.

INDICATING DEVICE FOR VEHICLES.

1,075,555.     Specification of Letters Patent.     Patented Oct. 14, 1913.

Original application filed April 28, 1906, Serial No. 314,261. Divided and this application filed February 23, 1907. Serial No. 358,601.

*To all whom it may concern:*

Be it known that I, MILDRED FELIX, a citizen of the United States, residing at New York city, in the county of New York and State of New York, have invented certain new and useful Improvements in Indicating Devices for Vehicles, of which the following is a specification.

My invention relates to improvements in devices for indicating the identity of vehicles, and has as its object the providing of a device controlled and operated by the driving means of a vehicle.

The object of the invention is the providing of a mark of identification suitably mounted on a running member of a vehicle adapted to be transmitted to the surface or road bed whereon said running member travels.

Another object of the invention is the providing of a device used in connection with the said mark of identification mounted on the running member of a vehicle, the same being a means for either applying to the mark of identification or to the road bed whereon said running member travels a temporary fixative which renders the mark temporarily fixed.

The invention as hereinafter described is a divisional application of applicant's original application filed April 28, 1906, Serial Number 314,261.

In the following is described in connection with the accompanying drawings one embodiment of the invention, the features thereof being more particularly pointed out hereinafter in the claims.

In the drawings Figure 1 is a side elevation of the device. Fig. 2 is a rear view of a road vehicle illustrating the application of the liquid applying device. Fig. 3 is an enlarged vertical sectional view of the liquid applying means illustrating the parts for operating the same. Fig. 4 is a detail side elevation of a running member of a vehicle illustrating in connection therewith the application of a plate having formed thereon a mark of identification. Fig. 5 is a side elevation of a road vehicle illustrating a modified form of the liquid applying means.

Similar numerals of reference indicate similar parts throughout the several views.

1 indicates the body of a vehicle suitably mounted on wheels 2 which are in turn mounted on drive shaft 3. Wheels 2 have mounted on their respective running surfaces identification means preferably comprising a plate or plurality of plates 4 fastened thereto by means of a series of chains 5, said identification plates and chains having the additional function of acting as means to prevent the wheels from skidding, etc. Drive shaft 3 may be inclosed by a hood 6 to prevent the oil thrown off by the action of the parts operating thereon from falling on the road bed.

7 indicates the well-known driving means mounted on driving shaft 3 which is in turn mounted in bearings 8.

9 is a feed cylinder or tank preferably mounted in the vehicle body and adapted to be fastened thereto by means of a flanged plate 10.

11 are oil supply leads adapted to supply the several bearings of the operating parts of the vehicle with oil for lubricating purposes.

12 is a hood or casing adapted to project beyond the body of the vehicle and overhang one of the wheels 2. End wall 13 thereof has formed therein a reception groove 14 adapted to receive the pivotally mounted spur gear 15. Said end wall 13 has formed therein a port or by-pass 16 affording means of communication between feed cylinder 9 and ejector nozzle 17, said ejector nozzle 17 being preferably cast with said end wall as at 18. Spur gear 15 is adapted to have cut on the flat surface thereof a port or fluid passage-way 19. The object of said port or fluid passage-way 19 is to provide means whereby when gear 15 is actuated, port or fluid passage-way 19 will register with by-pass 16 and permit a limited amount of fluid to pass into ejector nozzle 17.

The device as illustrated in Fig. 3 of the drawings comprises a collar 20 suitably mounted on said drive shaft 3 which in turn has mounted therein a striking arm or pin 21 adapted to register with arms 22 mounted on star wheel 23. Said star wheel 23 is mounted on transverse shaft 24 at one end thereof, the other end of said shaft having mounted thereon a spur gear 25 which is adapted to engage or mesh with gear 26 mounted on transverse shaft 27 suitably supported or mounted in bearings (not shown) fastened in any suitable manner to the body portion of said vehicle 1.

28 is a pinion mounted on shaft 29 and is adapted to engage said gear 26. On shaft 29 there is also a worm 28' which meshes with gear 15 mounted in casing 13.

The device as shown in Fig. 5 of the drawings illustrates a modified form of construction in which the liquid supplying means or feed has fastened thereto an ejector nozzle 30 which is adapted to follow the contour of wheel 31, the mouth portion 32 thereof ending directly in front of said wheel 31 slightly above the level of the road bed. Wheel 31 is adapted to have mounted on its outer surface a continuous armor plate or casing 33 having indicated or formed thereon a series of marks of identification either countersunk or raised thereon. The object of said continuous series of marks or means of identification is to provide a sure means of transmitting the marks of identification onto the road bed whereon said wheel travels.

The pipe 34 as shown in Figs. 2 and 3 of the drawings is an air pipe leading from any suitable air source. (Said air source is not shown in either one of these two figures.) The end 35 of said air pipe connects with auxiliary nozzle 36 formed on the extreme end of ejector nozzle 17. The object of said air blast and said auxiliary nozzle 36 is to provide means of assisting the application of the liquid, to the marks of identification mounted on the running member of a vehicle.

The operation of the device is as follows: Pin 21 mounted in axle 20 on drive shaft 3 operates star wheel 23 which in turn operates spur gear 25 meshing with gear 26 which in turn engages pinion 28 mounted on shaft 29. Said pinion 28 operates gear 15 mounted in the end wall or casing 13 of the fluid applying means. Fluid from container 9 will pass through by-pass 16 through port 19 in said spur gear 15 into ejector nozzle 17 whence it passes into auxiliary ejector 36 mounted in the end ejector nozzle 17 and will be retained therein until a sudden blast of air is permitted to enter therein through air pipe or lead 34.

It is obvious that the liquid applying means is not wholly essential in the operation of the device as herein disclosed as the marks of identification may be mounted on a running member or members of a vehicle in such manner as will permit the same to be transmitted to the road bed whereon said running member travels in a temporarily fixed condition.

It is also obvious that the application of the liquid to the marks of identification mounted on the running members of a vehicle may have operating in conjunction therewith, as hereinbefore described, the liquid applying means in order to insure the transmission of said marks of identification to the road bed whereon said running members travel in a positive temporary fixed condition.

It is further obvious that the device as herein described and parts comprising the essential features thereof may be widely varied without departing from the spirit of the invention.

Having described my invention what I claim and desire to secure by Letters Patent of the United States is:—

1. A device for identifying vehicles having a driving shaft and wheels driven thereby, comprising a detachable plate mounted on one of said wheels, a reservoir containing a fixative and mounted in the body of said vehicle, a by-pass from said reservoir, a port adapted to register with said by-pass, an ejector nozzle communicating with said port, a shaft, means for driving said shaft from said driving shaft, means controlled by the actuation of said shaft for causing said port to register with said by-pass, and means for discharging the fixative from said ejector nozzle onto said plate.

2. A device for identifying vehicles having a driving shaft and wheels driven thereby, comprising a detachable plate mounted on one of said wheels, a reservoir containing a fixative and mounted in body of said vehicle, a by-pass from said reservoir, a port adapted to register with said by-pass, an ejector nozzle communicating with said port, a shaft, a star-wheel on said shaft adapted to be driven by the movement of said driving shaft, gearing controlling the discharge of the fixative from said reservoir through said by-pass and a second gear on said shaft adapted to actuate said last mentioned gearing.

In testimony whereof I have hereunto signed my name in the presence of two subscribing witnesses.

MILDRED FELIX.

Witnesses:
ROBERT W. ASHLEY,
MAY S. AVERY.